United States Patent
Webb et al.

(10) Patent No.: US 6,880,010 B1
(45) Date of Patent: Apr. 12, 2005

(54) METHODS, SYSTEMS, AND COMPUTER PROGRAM PRODUCTS THAT REQUEST UPDATED HOST SCREEN INFORMATION FROM HOST SYSTEMS IN RESPONSE TO NOTIFICATION BY SERVERS

(75) Inventors: Brian T. Webb, Raleigh, NC (US); Yih-Shin Tan, Raleigh, NC (US); Yongcheng Li, Raleigh, NC (US); David B. Gilgen, Raleigh, NC (US); James M. Mathewson, II, Chapel Hill, NC (US); Michael Srihari, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/394,536

(22) Filed: Sep. 10, 1999

(51) Int. Cl.$^7$ .............................................. G06F 15/16
(52) U.S. Cl. ...................................... 709/227; 709/228
(58) Field of Search ................................ 709/227–228, 709/229; 707/8

(56) References Cited

U.S. PATENT DOCUMENTS

| | | | | |
|---|---|---|---|---|
| 4,791,566 A | * | 12/1988 | Sudama et al. | 364/200 |
| 5,754,830 A | * | 5/1998 | Butts et al. | 395/500 |
| 5,905,866 A | * | 5/1999 | Nakabayashi et al. | 709/225 |
| 5,940,075 A | * | 8/1999 | Mutschler et al. | 345/760 |
| 5,958,013 A | * | 9/1999 | King et al. | 709/227 |
| 5,978,802 A | * | 11/1999 | Hurvig | 707/8 |
| 6,630,942 B2 | * | 10/2003 | Gerra et al. | 709/203 |

OTHER PUBLICATIONS

Microsoft Computer Dictionary, Fourth Edition by Microsoft Corporation ISBN:0735606153 Microsoft Press © 1999 (541 pages).*
Whatis.techtarget.com http://searchwebservices.techtarget-.com/sDefinition/0,,sid26_gci211580,00.html.*
U.S. Appl. No. 09/353,218, filed Jul. 14, 1999, Gilgen et al.

* cited by examiner

Primary Examiner—Glenton B. Burgess
Assistant Examiner—Anita Choudhary
(74) Attorney, Agent, or Firm—Myers Bigel Sibley & Sajovec; Stephen A. Calogero (57) ABSTRACT

A method of providing updated host screen information to a client application utilizing a request-response communications model includes establishing a first connection between the client application and a server application, wherein the server application provides updated host screen information to the client application in response to requests from the client application. A second connection is established between a monitor application and the server application. A notification of the availability of updated host screen information is received via the second connection at the monitor application. The updated host screen information is requested over the first connection responsive to receiving the notification. The requested updated host screen information is received at the client application and displaying utilizing the client application. Related systems and computer program products are also disclosed.

25 Claims, 7 Drawing Sheets

```
File Distribute Inquire Options Help

200                       Search Results

For a record, press a function key -or- type an Action Code and press Enter.
  A=Address    B=Backup         C=CC-list    E=Dept title  F=Feedback
  I=Show Ids   J=JobResp(1pers) K=Calendar   L=Local data  O=Update/Open
  P=Phones     R=Rpts-To-All    T=To-list    U=Rpts-Chain  V=View record
                                                  Lines   7 to 12 of 185
                                                  Columns 50 to 81 of 157

ASSIGNEE RTP WASHA07

Name                            EmpSt Tie-line Node
Li, Michael C.T.                Reg     4095   IBMUSM
Li, Ruey-Feng                   Mgr     5030   IBMUSM
Li, Shuping *CONTRACTOR*        Contr   5937
Li, Yi *CONTRACTOR*             Contr   4904   IBMUSM
Li, Yongcheng                   Reg     2693   IBMUSM
Li, Yunlong                     Reg     2172   IBMUSM Command ===>
F1=Help     F2=Set 2   F3=Exit     F4=Send note  F5=Rpts-To-All  F6=Show dept/team
F7=Backward F8=Forward F9=JobResp(all) F10=Actions F11=Dist list
F12=Cancel
```

METHODS, SYSTEMS, AND COMPUTER PROGRAM PRODUCTS THAT REQUEST UPDATED HOST SCREEN INFORMATION FROM HOST SYSTEMS IN RESPONSE TO NOTIFICATION BY SERVERS

FIELD OF THE INVENTION

The present invention relates to network computing in general, and more particularly, to the communication between servers and clients.

BACKGROUND OF THE INVENTION

Some applications that run on legacy host systems can be accessed using a display terminal running a terminal protocol. The terminal protocol may enable communications to and from the display terminal, such as when a screen is transmitted to the display terminal and when user input is transmitted to the host system. Such protocols are sometimes referred to as "2 way asynchronous" communications. In such a terminal protocol, for example, updated (or new) screens generated by the host application may be transmitted to the display terminal without a request from the user. In other words, updated screens may be automatically transmitted to the display terminal.

It is also known to provide access to applications running on legacy host systems over a network, using a server running a terminal emulation program. For example, screens generated by host applications traditionally accessed using a display terminal using a terminal protocol may be reformatted by a server terminal emulation program into markup language. The markup language format may then be provided in response to a request from a web browser application. Thus, the use of a server terminal emulation program enables the legacy host system to be accessed using a browser over, for example, the World Wide Web (WWW), the internet or an intranet, rather than a display terminal over a terminal protocol.

Unfortunately, some of the communications protocols used to provide terminal emulation between browsers and legacy host systems may not provide the same communications functions provided by the terminal protocols described above. For example, the Hypertext Transport Protocol (HTTP) utilizes a synchronous "request-response communications model." In HTTP, the server typically only provided information to the browser in response to a request from the browser. In such a system, it may be difficult to provide the asynchronous communications described above. In particular, it may be difficult to provide updated screens to the browser automatically.

Some systems may allow a user to provide manual requests for updated screens to the legacy host system which may cause the server to provide an updated screen generated by the legacy host system. For example, a refresh button may be provided wherein the user may request an updated screen from the legacy host system. In addition to requiring user intervention, this type of solution to the synchronous communications problem may not provide an updated host screen because the refresh request may occur prior to the generation of an updated screen. Accordingly, there is a need for methods, systems, and computer program products that allow improved communication with legacy host applications over the WWW.

SUMMARY OF THE INVENTION

It is, therefore, an object of the present invention to allow improved communication between client applications and legacy host applications where a synchronous communication model is used.

It is a further object of the present invention to allow synchronous clients to receive asynchronous communications without requiring user intervention.

These and other objects of the present invention are provided by methods, systems, and computer program products that establish a first connection between a client application and a server application, wherein the server application provides updated host screen information to the client application in response to requests from the client application by establishing a second connection between a monitor application and the server application. A notification of the availability of updated host screen information is then received via the second connection at the monitor application and a request for updated host screen information is transmitted over the first connection responsive to receiving the notification. The requested updated host screen information is received at the client application and displayed utilizing the client application.

By utilizing an alternate or second connection to the client, the server may notify the client of the availability of host screen information and, thereby, prompt the client to request the host screen information using the first, synchronous, connection. Because client application requests the updated host screen information in response to the notification from the server, the need for the user to manually request updated host screen information may be reduced.

In one embodiment, the monitoring application which monitors the alternate connection for notifications may be relatively small notification code or an applet that is embedded in a web page description (HTML) provided to the client. When executed, the notification code establishes a notification connection to the server. When the notification code receives notification of the availability of updated host screen information, the notification code signals the client application and terminates. Accordingly, the relatively small notification code can be more readily embedded in the HTML description and may reduce the time needed to download the updated host screen information.

As will be appreciated by those of skill in the art, the present invention may be embodied as methods, systems (apparatus) and/or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as methods, systems or computer program products. Accordingly, the present invention may take the form of an entirely hardware embodiment, an entirely software embodiment or an embodiment combining software and hardware aspects.

The present invention is described herein using flowchart illustrations and block diagrams. It will be understood that each block of the block diagrams or flowchart illustrations, and combinations of blocks in the block diagrams or flowchart illustrations, can be implemented by computer program instructions. These program instructions may be provided to a processor(s) within a computer system, such that the instructions which execute on the processor(s) create means for implementing the functions specified in the block diagrams or flowchart block or blocks. The computer program instructions may be executed by the processor(s) to cause a series of operational steps to be performed by the processor(s) to produce a computer implemented process such that the instructions which execute on the processor(s) provide steps for implementing the functions specified in the block diagrams or flowchart block or blocks.

Accordingly, blocks of the block diagrams or flowchart illustrations support combinations of means for performing the specified functions, combinations of steps for performing the specified functions and program instruction means for performing the specified functions. It will also be understood that each block of the block diagrams or flowchart illustrations, and combinations of blocks in the flowchart illustrations, can be implemented by special purpose hardware-based systems which perform the specified functions or steps, or combinations of special purpose hardware and computer instructions.

The clients and the servers described herein (in whole or in part) may be remote from one another or resident in the same location. The phrase "client application" includes applications, such as browsers, that request information, such as host screens generated by host systems. As used herein the term "terminal emulation" includes any form of user or programmable access and interactions with host screens generated by host systems. Although the present invention is described with reference to terminal emulation, it will be understood that the scope of the present invention includes other systems and services.

Figure 1:
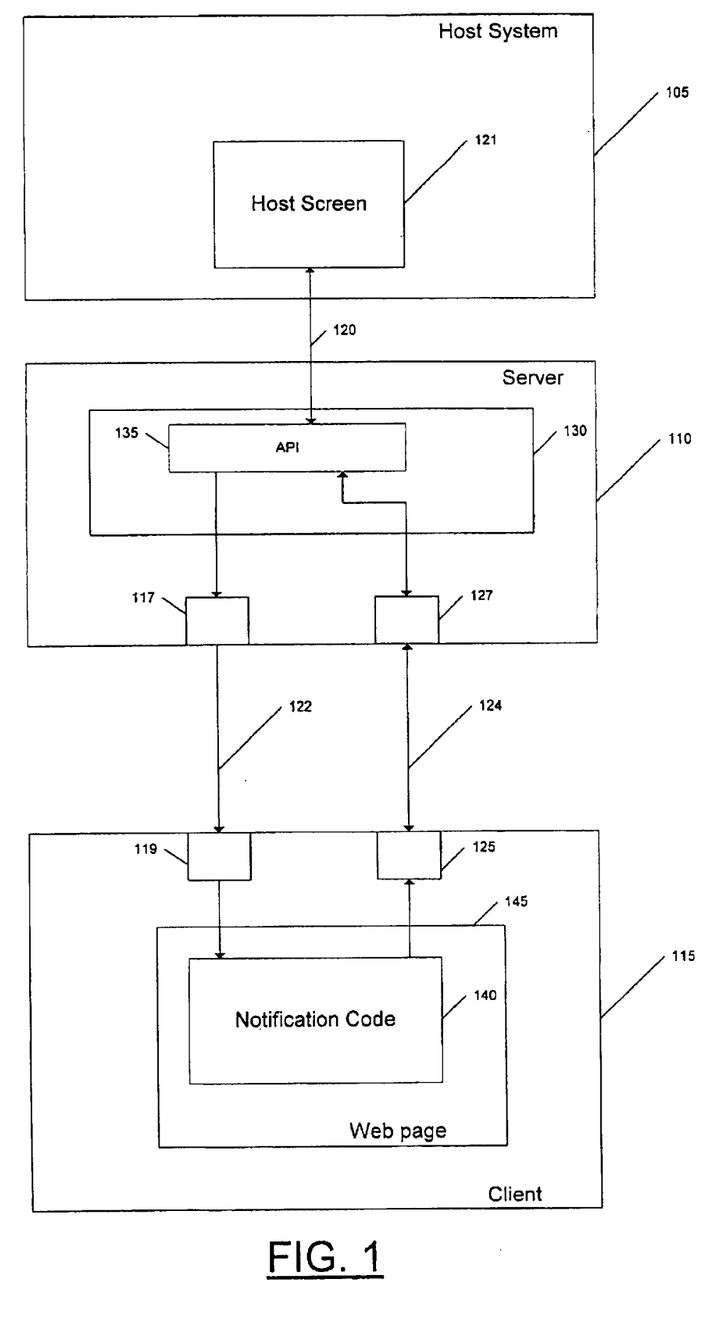
FIG. 1 is a block diagram of first embodiment of a system according to the present invention.

FIG. 1 is a block diagram of a first embodiment of a system according to the present invention. According to FIG. 1, a server 110 provides terminal emulation sessions for a client application 115 to a host system 105 that runs legacy host applications. The host system 105 generates output in the form of host datastreams 120 that include host screen information such as tables, paragraphs of data and the like which can appear as part of a host screen 121. The host datastreams 120, including host screen information, are transmitted to the server 110.

During operation, the server 110 receives host screen information from the host system 105. The host screen information can be generated responsive to a request by the server 110 or responsive to non-server events. For example, the host system 105 can transmit host screen information to the server 110 in response to user input or a change in the status of the host system 105. Accordingly, the host screen information generated by the host system 105 can update the host screen information previously received by the server 110. It will be understood that the phrase "updated host screen information" includes host screen information not previously received by the server 110 as well as host screen information previously received by the server 110. For example, when the server 110 receives host screen information previously received by the server 110, the host screen information provided by the host system 105 represents updated host screen information.

When the server 110 receives updated host screen information, an Application Programming Interface (API) 135 generates a message which is used to notify the client application 115 that the server 110 has received updated host screen information. The notification is transmitted to the client application 115 over a notification connection 122 from a first server socket 117 to a first client socket 119. The API can be Extended High Level Language API, Host Access Class Library, Open Host Interface Objects, or the like.

The server 110 receives requests for updated screen information from the client application 115 via a request connection 124. It will be understood to those having skill in the art that the request connection 124 may be, for example, the HTTP connection and can carry information according to the response-request communication model. It will be understood that, the server can be a mid-tier WWW server that conducts terminal emulation sessions for multiple client applications 115 running on respective client workstations.

A connection can be provided by a communications protocol, such as Transmission Control Protocol/Internet Protocol (TCP/IP). A connection between applications can be accessed using sockets. For example, according to FIG. 1, the API 135 accesses the first connection 122 to the client application 115 via the first server socket 117. The client application 115 accesses the first connection 122 via the first client socket 119. The notification connection 122 and the request connection 124 can be provided over separate communications links or a single communications link, such as a modem.

An application 130 running on the server 110 formats the updated host screen information as web page descriptions using Host On Demand (HOD) functions to generate a markup language format, such as Extensible Markup Language (XML) or Hypertext Markup Language (HTML) for the updated host screen information. The formatted updated host screen information (e g, a web page description) is transmitted to the client application 115 over the request connection 124 from a second server socket 127 to a second client socket 125. HOD functions and reformatting of updated host screen information are discussed, for example, in U.S. patent application Ser. No. 09/353,218 filed Jul. 14, 1999, entitled *Methods, Systems, and Computer Program Products For Applying Styles to Host Screens Based on Host Screen Content* which is assigned to the assignee of the present application and which is incorporated herein by reference in its entirety.

The client application 115 displays the formatted updated host screen information as a web page 145. The formatted updated host information can include notification code 140 or application, such as a Java® applet, which can be invoked by the client application 115. For example, the server 110 can embed the notification code 140 in the formatted updated host information. When the formatted updated host information is received, the client application 115 recognizes the embedded notification code 140 and runs it. Alternately, the formatted updated host screen information includes a reference locator, such as a Uniform Resource Locator (URL) which can be used to locate and download the referenced notification code 140. The client application 115 can be a web browser, such as Netscape Navigator® marketed by Netscape Communications Corporation based in Mountain View, Calif.

The client application 115 can run on a client workstation which is not shown.

The client workstation can be an input device with a display such as a computer terminal running the client application 115, a personal computer, a networked computer, a smart phone, a personal digital assistant, a handheld computer, or the like.

In operation, the notification code 140 establishes the notification connection by initializing the first client socket 119 to the first connection 122 and waits for a notification from the server 110 over the notification connection 122. The notification from the server 110 indicates that the server 110 has received updated host screen information associated with a terminal emulation session conducted for the client application 115. The notification code 140 transmits a request for formatted updated host screen information to the server 110 over the request connection 124. According to the present invention, the request for the updated host screen information via the request connection 124 is responsive to the notification from the server via the notification connection 122.

Figure 2:
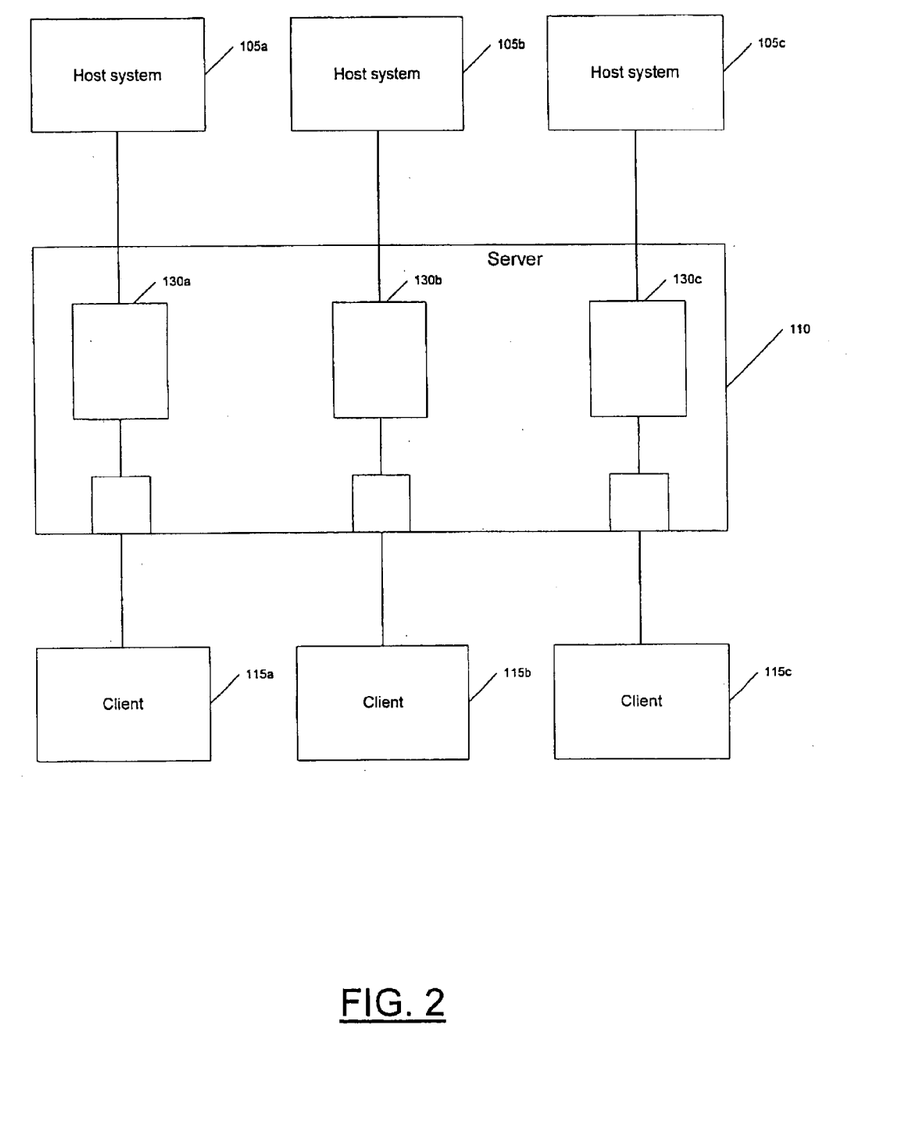
FIG. 2 is a block diagram of a second embodiment of a system according to the present invention.

FIG. 2 is a block diagram of a second embodiment of a system according to the present invention wherein the server 110 provides terminal emulation session applications 130a–c for a plurality of respective client applications 115a–c. Each application 130a–c identifies the requests received from the respective client application 115a–c. In particular, Identifiers (IDs) are associated with requests made by each client 115a–c. For example, the ID included in a first request from the first client application 115a for updated host screen information identifies the first client application 115a, a second request from the second client application 115b for updated host screen information identifies the second client application 115b, and a third request from the third client application 115c for updated host screen information identifies the third client application 115c. Accordingly, the respective application 130a–c can transmit the formatted updated host screen information to the appropriate client application 115a–c.

Figure 3:
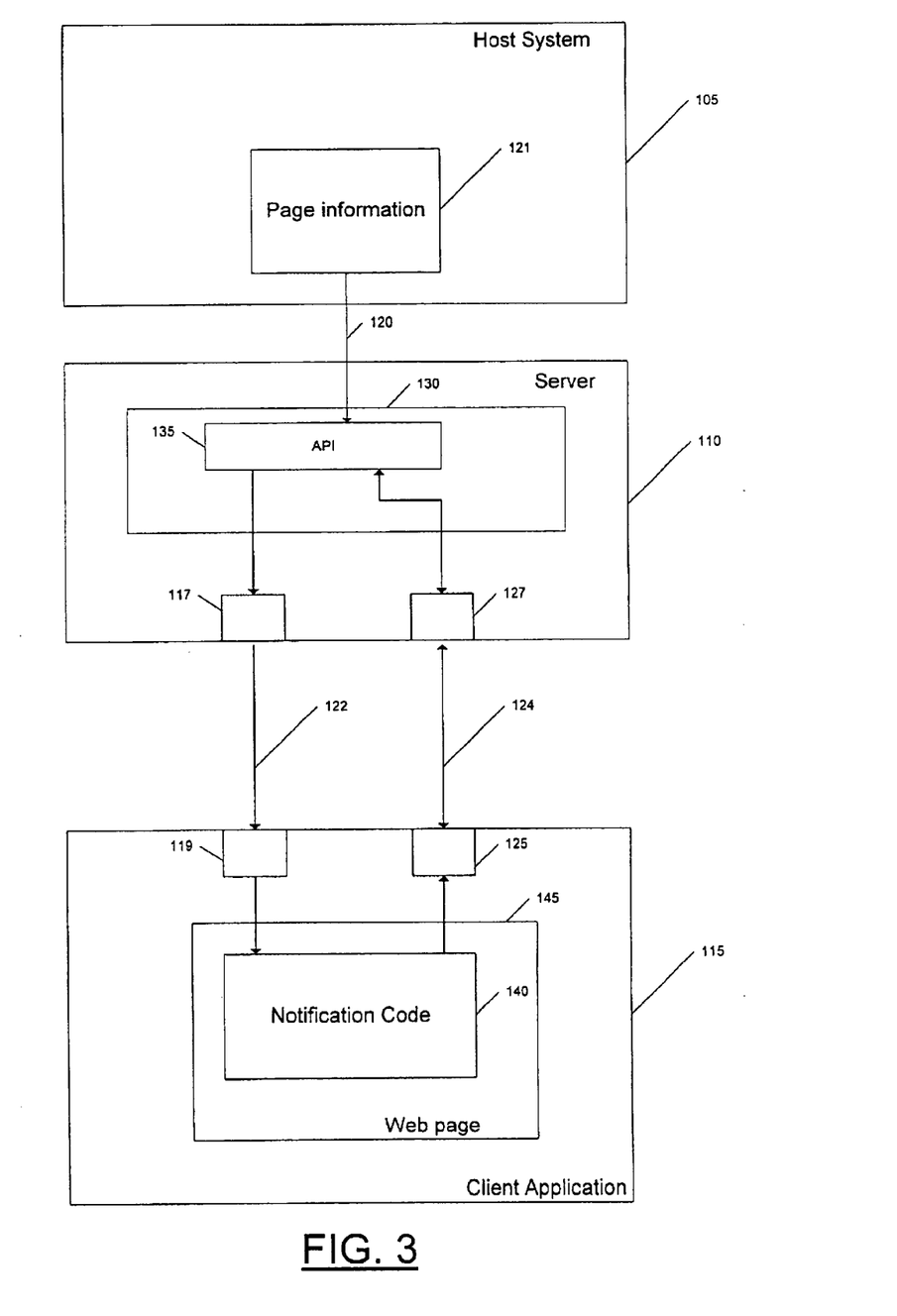
FIG. 3 is a block diagram of a third embodiment of a system according to the present invention.

FIG. 3 is a block diagram of a third embodiment of a system according to the present invention. According to FIG. 3, paging messages are issued to the host system 105. The paging messages can include page information such as telephone numbers, text information, audio information, display information, or the like. The page information is transmitted to the server 110 which notifies the notification code 140 via the request connection 122. The client application 115 requests the page information from the server 110 over the request connection 124 in response to the notification. The server 110 transmits the page information to the client application 115 which can provide the page information to the user.

Figure 4:
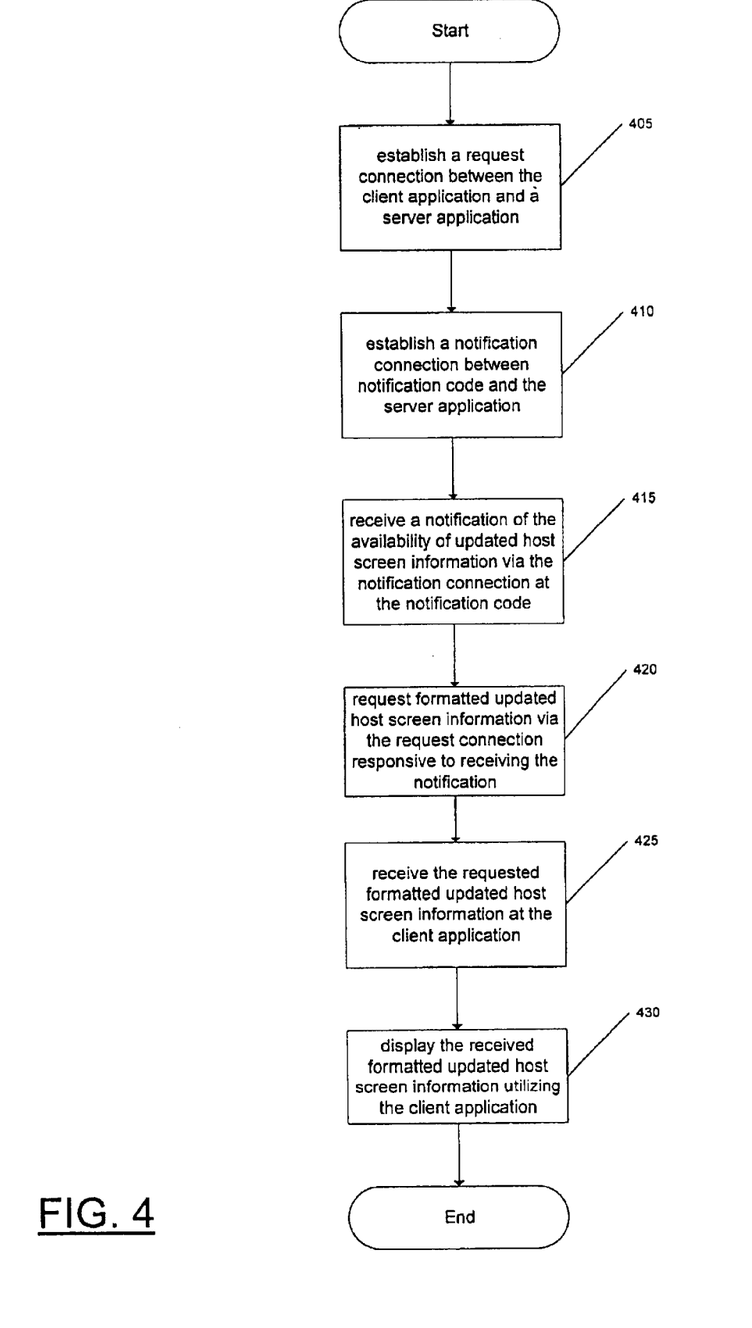
FIG. 4 is a flowchart that illustrates operations of a system according to the present invention.

FIG. 4 is a flowchart that illustrates operations of a system according to the present invention. According to FIG. 4, the request connection 124 is established between the client application 115 and the server 110 (block 405). The server 110 provides formatted updated host screen information to the client application 115 over the request connection 124 in response to requests from the client application 115. The notification connection 122 is established between the notification code 140 and the server 110 (block 410). The notification code 140 monitors communications from the server 110 over the notification connection 122.

The server 110 receives updated host screen information from the host system 105 and notifies the client application 115 of the availability of the updated host screen information via the notification connection 122 (block 415). For example, the server 110 can transmit a message via the notification connection 122 to the notification code 140. Upon receiving the notification of available updated host screen information, the client application 115 transmits a request for the formatted updated host screen information to the server 110 (block 420) via the request connection 124. The server 110 responds to the request by transmitting the formatted updated host screen information to the client application 115 via the request connection 124. The formatted updated host screen information is received by the client application 115 (block 425) and displayed (block 430).

Figure 5:
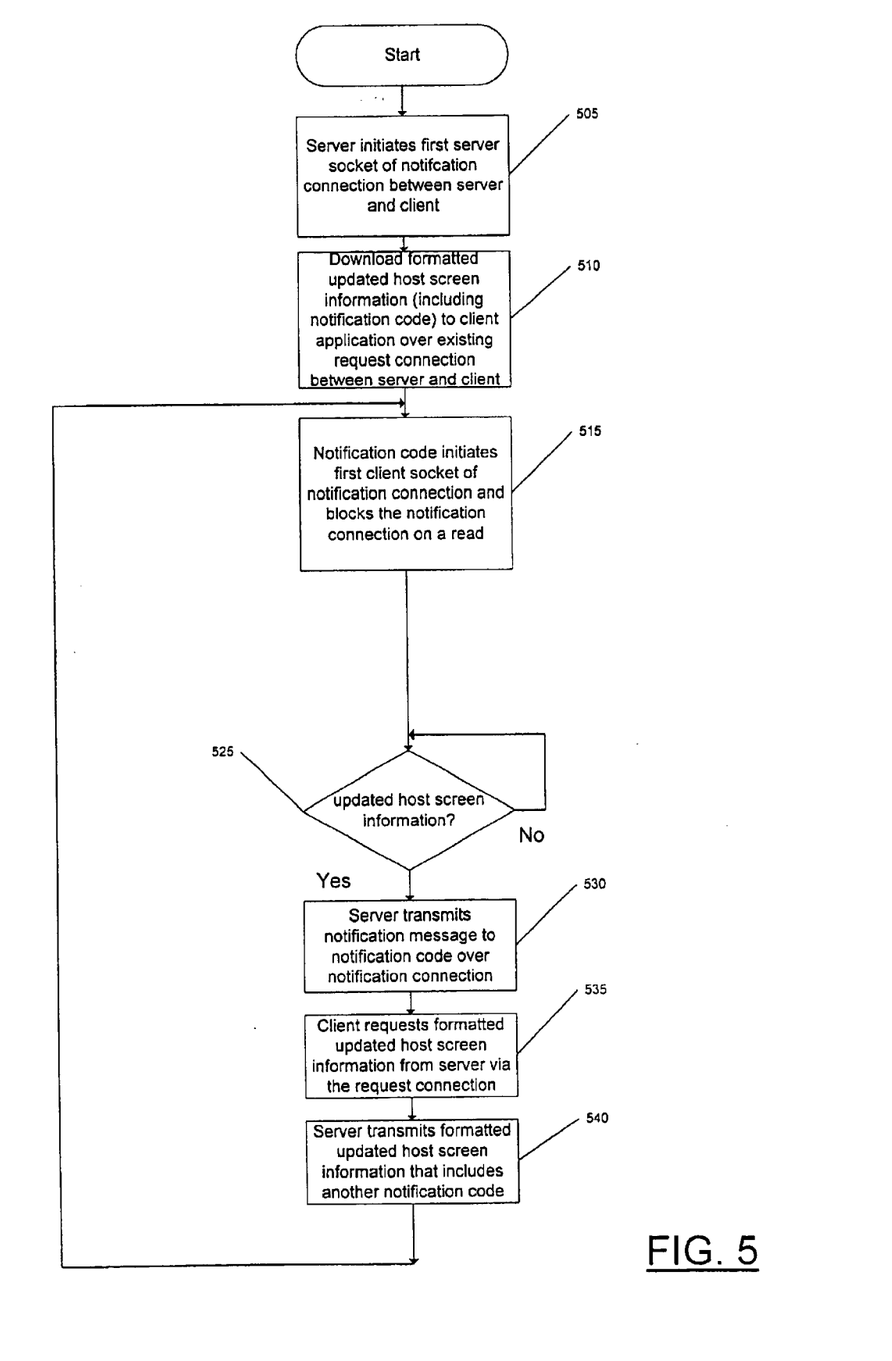
FIG. 5 is a flowchart that illustrates operations of a system including downloading of notification code according to the present invention.

FIG. 5 is a flowchart that illustrates operations of a system including downloading of notification codes according to the present invention. According to FIG. 5, the server 110 initializes the first server socket 117 of the notification connection 122 (block 505). Formatted updated host screen information (web page) is downloaded from the server 110 to the client application 115 over the request connection 124 (block 510). The formatted updated host screen information includes a notification code 140 which can be run by the client application 115.

The notification code 140 initializes the first client socket 119, establishing the notification connection 122 between the server 110 and the notification code 140 and blocks on a read of the first client socket 119 (block 515). In other words, the notification code 140 continues to wait for a message to be received from the server 110 over the notification connection 122.

When the server 110 receives updated host screen information from the host system 105 (block 525), the server 110 transmits a notification message to the notification code 140 over the notification connection (block 530). The notification code 140 receives the notification message and signals the client application 115. The notification code 140 may then terminate.

The client application 115 requests formatted updated host screen information from the server 110 (block 535) in response to the notification message, whereupon the server 110 transmits the formatted updated host screen information received from the host system 105 (block 540). The formatted updated host screen information includes another notification code 140 which initializes the first client socket 119 of the notification connection 122 between the server 110 and the client application (block 515).

Figure 6:
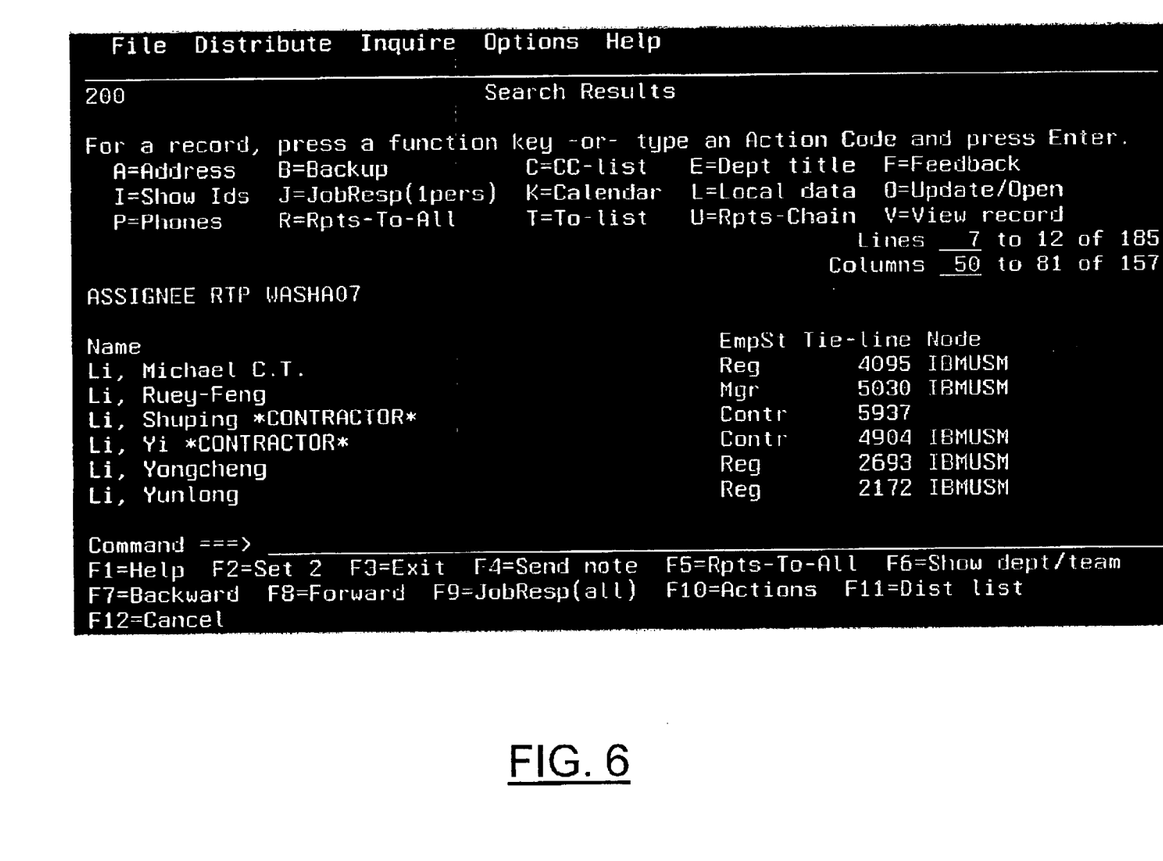
FIG. 6 is a capture of a host screen generated by a host system including host screen information.
Figure 7:
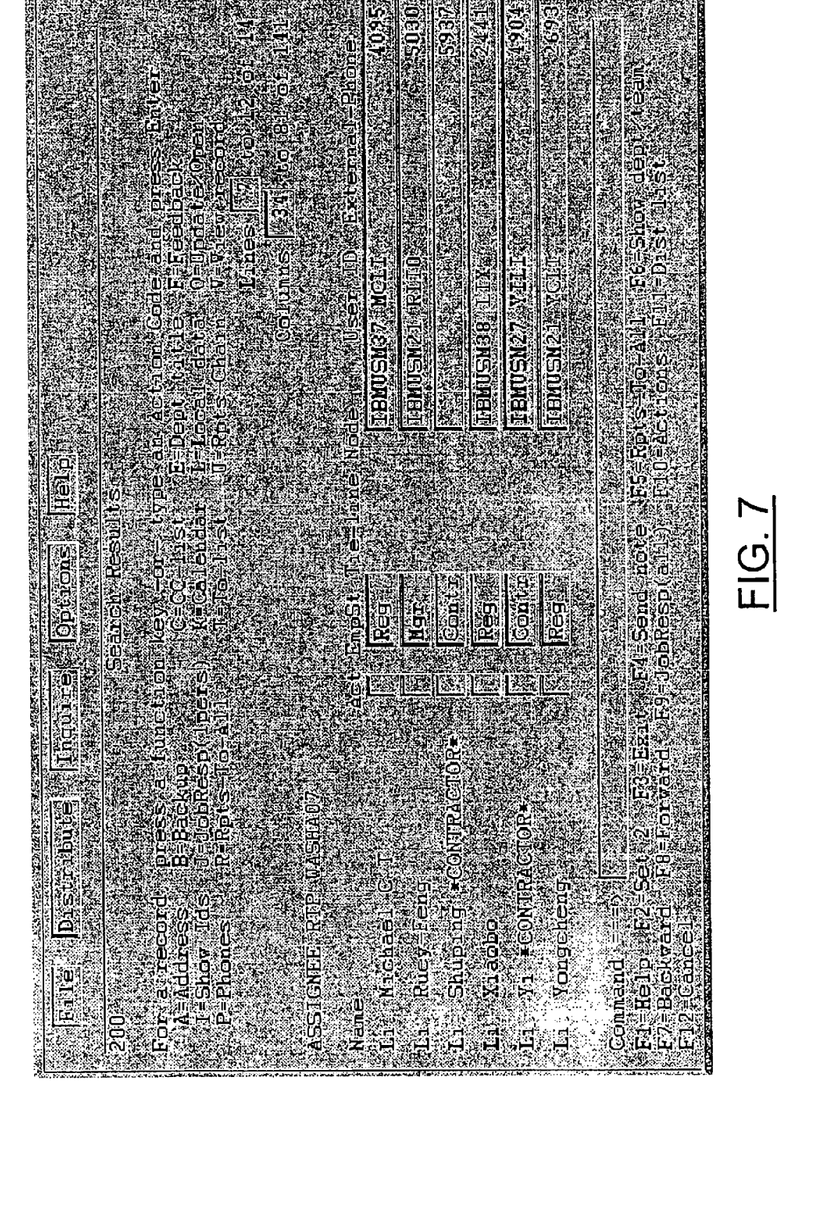
FIG. 7 is a capture of a screen rendered by a client application screen including formatted updated host screen information.

A detailed example of operations of the present invention will now be described in reference to FIGS. 6 and 7. After establishing the request and notification connections 122, 124 the host screen 121, including host screen information, shown in FIG. 6 is generated by the host system 105. The server 110 notifies the notification code 140 of the availability of updated hosts screen information over the notification connection 122.

The notification code 140 receives the notification and signals the client application 115. The client application 115 requests the formatted updated host screen information over the request connection 124. The server 110 formats the host screen information as fields as described in *Methods, Systems, and Computer Program Products for Applying Styles to Host Screens Based on Host Screen Content*. For example, the first row of the name information can be formatted as:

Field 1: position="1042" length="26" protected="true" numeric="true" hidden="false" reset="false" modified="false" text="Li, Michael C T"

Field 2: position="1069" length="1" protected="false" numeric="false" hidden="false" reset="false" modified="false" underscore="true" color="cyan" text=" "

Field 3: position="1072" length="5" protected="false" numeric="false" hidden="false" reset="false" modified="false" text="Reg"

Field 4: position="1078" length="8" protected="false" numeric="false" hidden="false" reset="false" modified="false" color="cyan" text="4095"

Field 5: position="1087" length="33" protected="false" numeric="false" hidden="false" reset="false" modified="false" text="IBMUSM3"

The fields included in the updated host screen information are translated to HTML, as shown below, to provide the formatted updated hosts screen information. It will be understood that fields included in the updated hosts screen information that are not recognized by the application 130 can be ignored.

```
<TR>
<TD>
Li, Michael
C.T.          ;  
</TD>
<TD>
<input type="text" value=" " length="1" maxlength="1">
</TD>
<TD>
Reg
</TD>
<TD>
<FONT COLOR="#00FFFF">4095</FONT>
</TD>
<TD>
IBMUSM
</TD>
</TR>
```

The notification code 140, or a reference thereto, is included in the HTML description. For example, a reference to the notification code 140 can be expressed as:

```
<HTML>
. . .
HTML description of updated host screen information
. . .
<Applet Code="MyClass.class">
<HTML>
```

The HTML description of the updated host screen information is downloaded to the client application 115. The client application examines the HTML description, recognizes the reference to the notification code "MyClass.class", accesses the notification code 140, runs the notification code 140, and renders the formatted updated host screen information as shown in FIG. 7. The notification code 140 initializes the first client socket 119 and waits for a new notification of available updated host screen information over the notification connection 122.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of providing updated legacy host screen information to a client application as terminal emulation between a legacy host system and the client application the client application utilizing a request-response communications model, the method comprising:

establishing a first connection between the client application and a server application, wherein the server application provides updated legacy host screen information to the client application in response to requests from the client application using an HTTP request-response communications model, wherein the updated legacy host screen information is based on asynchronously generated information formatted for a character terminal of a host legacy system as part of terminal emulation provided between the client application and the host legacy system;

establishing a second connection between a monitor application and the server application;

receiving a notification of the availability of updated legacy host screen information via the second connection at the monitor application using the HTTP request-response communications model;

requesting the updated legacy host screen information over the first connection using HTTP request-response communications model responsive to receiving the notification;

receiving the requested updated legacy host screen information at the client application; and displaying the received updated host screen information utilizing the client application.

2. The method of claim 1, wherein the client application comprises a web browser and wherein the monitoring application comprises notification code.

3. The method of claim 2, wherein the notification code is provided with updated legacy host screen information, the method further comprising the steps of:

extracting the notification code from the host screen information; and executing the notification code.

4. The method of claim 2, wherein the updated legacy host screen information comprises a Markup Language.

5. The method of claim 1, wherein the updated legacy host screen information comprises terminal emulation information.

6. The method of claim 1, wherein the first and second connections are conducted via a single communications link.

7. The method of claim 1, wherein the server application provides updated legacy host screen information to a second client application in response to requests from the second client application, the method further comprising:

identifying the client application that requested the updated legacy host screen information.

8. A system of providing updated legacy host screen information to a client application as terminal emulation between a legacy host system and the client application, the client application utilizing a request-response communications model, the system comprising:

means for establishing a first connection between the client application and a server application, wherein the server application provides updated legacy host screen information to the client application in response to requests from the client application using an HTTP request-response communications model, wherein the updated legacy host screen information is based on asynchronously generated information formatted for a character terminal of a legacy host system as part of terminal emulation provided between the client application and the host legacy system;

means for establishing a second connection between a monitoring application and the server application;

means for receiving updated legacy host screen information from the legacy host system;

means for transmitting a notification of the availability of updated legacy host screen information to the monitoring application over the second connection using the HTTP request-response communications model responsive to receiving the updated legacy host screen information;

means for receiving a request for the updated legacy host screen information from the client application over the first connection using the HTTP request-response communications model; and means for transmitting the received updated legacy host screen information to the client application over the first connection in response to receiving the request for the updated legacy host screen information from the client application.

9. The system of claim 8, wherein the client application comprises a web browser and wherein the monitoring application comprises an, notification code.

10. The system of claim 9, wherein the means for transmitting the received updated legacy host screen information further comprises means for incorporating the notification code in the updated legacy host screen information transmitted to the client application.

11. The system of claim 8, wherein the server application provides updated legacy host screen information to a second client application in response to requests from the second client application, the system comprising:

means for identifying the client application that requested the updated legacy host screen information.

12. A computer program product that provides updated legacy host screen information to a client application as terminal emulation between a legacy host system and the client application, the client application utilizing a request-response communications model, the computer program product comprising:

a computer-readable storage medium having computer-readable program code means embodied in said medium, said computer-readable program code means comprising:

computer readable program code means for establishing a first connection between the client application and a server application, wherein the server application provides updated legacy host screen information to the client application in response to requests from the client application using an HTTP request-response communications model, wherein the updated legacy host screen information is based on asynchronously generated information formatted for a character terminal of a legacy host system as part of terminal emulation provided between the client application and the host legacy system;

computer readable program code means for establishing a second connection between a monitor application and the server application;

computer readable program code means for receiving a notification of the availability of updated legacy host screen information via the second connection at the monitor application using the HTTP request-response communications model;

computer readable program code means for requesting the updated legacy host screen information over the first connection using the HTTP request-response communications model responsive to receiving the notification;

computer readable program code means for receiving the requested updated legacy host screen information at the client application; and computer readable program code means for displaying the received updated legacy host screen information utilizing the client application.

13. The computer program product of claim 12, wherein the client application comprises a web browser and wherein the monitoring application comprises an notification code.

14. The computer program product of claim 13, wherein the notification code is provided with updated legacy host screen information, the computer program product further comprising:

computer readable program code means for extracting the notification code from the host screen information; and computer readable program code means for executing the notification code.

15. The computer program product of claim 13, wherein the updated legacy host screen information comprises a Markup Language.

16. The computer program product of claim 12, wherein the updated legacy host screen information comprises terminal emulation information.

17. The computer program product of claim 12, wherein the first and second connections are conducted via a single communications link.

18. The computer program product of claim 12, wherein the server application provides updated legacy host screen information to a second client application in response to requests from the second client application, the computer program product further comprising:

computer readable program code means for identifying the client application that requested the updated legacy host screen information.

19. A computer program product of providing updated legacy host screen information to a client application as terminal emulation between a legacy host system and the client application, the client application utilizing a request-response communications model, the computer program product comprising:

a computer-readable storage medium having computer-readable program code means embodied in said medium, said computer-readable program code means comprising:

computer readable program code means for establishing a first connection between the client application and a server application, wherein the server application provides updated legacy host screen information to the client application in response to requests from the client application using an HTTP request-response communications model, wherein the updated legacy host screen information is based on asynchronously generated information formatted for a character terminal display of a host legacy system as part of terminal emulation provided between the client application and the host legacy system;

computer readable program code means for establishing a second connection between a monitoring application and the server application;

computer readable program code means for receiving updated legacy host screen information from a host system;

computer readable program code means for transmitting a notification of the availability of updated legacy host screen information to the monitoring application over the second connection using the HTTP request-response communications model responsive to receiving the updated legacy host screen information;

computer readable program code means for receiving a request for the updated legacy host screen information from the client application over the first connection using the HTTP request-response communications model; and computer readable program code means for transmitting the received updated legacy host screen information to the client application over the first connection in response to receiving the request for the updated legacy host screen information from the client application.

20. The computer program product of claim 19, wherein the client application comprises a web browser and wherein the monitoring application comprises an notification code.

21. The computer program product of claim 20, wherein the computer readable program code means for transmitting the received updated legacy host screen information further comprises:

computer readable program code means for incorporating the notification code in the updated legacy host screen information transmitted to the client application.

22. The computer program product of claim 19, wherein the server application provides updated legacy host screen information to a second client application in response to requests from the second client application, the computer program product comprising:

computer readable program code means for identifying the client application that requested the updated legacy host screen information.

23. A system for displaying updated legacy host screen information utilizing a web browser as part of terminal emulation provided between the client application and the web browser, comprising:

a host server application;

a browser application configured to communicate with the host server application using an HTTP request-response communications model;

a first connection configured to provide communication between the host server application and the browser application using the HTTP request-response communications model;

a notification application operably associated with the browser application that notifies the browser application to request updated legacy host screen information from the host server application for display by the browser application using the HTTP request-response communications model, wherein the updated legacy host screen information is based on asynchronously generated information formatted for a character terminal display of a host legacy system as part of terminal emulation provided between the client application and the host legacy system; and a second connection, established by the notification application, configured to provide communication between the host server application and the notification application using the HTTP request-response communications model.

24. A system according to claim 13, wherein the first and second connections comprise sockets.

25. A system according to claim 23 wherein the notification application is embedded in a web page provided to the browser application by the host server application.

* * * * *